United States Patent
Cannon et al.

(10) Patent No.: US 7,492,775 B2
(45) Date of Patent: Feb. 17, 2009

(54) ADDRESS DEFINITION FOR IP TELEPHONY SERVICES

(75) Inventors: Matthew J. Cannon, Dallas, TX (US); Steven R. Donovan, Plano, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 0 days.

(21) Appl. No.: 10/761,375

(22) Filed: Jan. 22, 2004

(65) Prior Publication Data

US 2004/0151194 A1    Aug. 5, 2004

Related U.S. Application Data

(63) Continuation of application No. 09/364,005, filed on Jul. 29, 1999, now Pat. No. 6,735,209.

(51) Int. Cl.
*H04L 12/28* (2006.01)
*H04L 12/56* (2006.01)

(52) U.S. Cl. .............. 370/401; 370/328; 370/338; 370/351; 370/353; 370/356; 370/395.3; 370/410; 370/426; 370/465; 370/466; 370/467; 379/221.1; 379/221.11; 379/221.12; 379/221.09; 455/426.1; 455/426.2; 455/432.2

(58) Field of Classification Search .............. 370/328, 370/338, 351–356, 384, 385, 395.3, 401, 370/410, 426, 465–467, 522; 379/221.1, 379/221.11, 222.12, 222.09, 229, 230, 243
See application file for complete search history.

(56) References Cited

U.S. PATENT DOCUMENTS

| | | | |
|---|---|---|---|
| 5,077,732 A | 12/1991 | Fischer et al. | |
| 5,303,286 A | 4/1994 | Wiedeman | |
| 5,353,335 A | 10/1994 | D'Urso et al. | |
| 5,434,907 A | 7/1995 | Hurst et al. | |
| 5,634,012 A | 1/1996 | Logston et al. | |
| 5,664,009 A | 9/1997 | Hurst et al. | |
| 5,680,116 A | 10/1997 | Hashimoto et al. | |
| 5,699,359 A | 12/1997 | Suga | |
| 5,732,219 A | 3/1998 | Blumer et al. | |
| 5,742,763 A | 4/1998 | Jones | |
| 5,745,556 A | 4/1998 | Ronen | |
| 5,768,361 A * | 6/1998 | Cowgill | 379/229 |
| 5,794,039 A | 8/1998 | Guck | |

(Continued)

FOREIGN PATENT DOCUMENTS

CN    1207226    2/1999

(Continued)

OTHER PUBLICATIONS

Rosenberg et al., "Programming Internet Telephony Services", IEEE Network, IEEE Ino., New York, US, vol. 13, No. 1, May 1999, pp. 42-49.

(Continued)

Primary Examiner—Chi H. Pham
Assistant Examiner—Raj K Jain

(57) ABSTRACT

A method of providing IP telephony services maps a telephony signaling protocol called party number nature of address indicator to an Internet signaling protocol nature of address indicator and a telephony signaling protocol called party number numbering plan indicator to an Internet signaling protocol numbering plan indicator.

10 Claims, 2 Drawing Sheets

U.S. PATENT DOCUMENTS

| | | | |
|---|---|---|---|
| 5,802,510 A | 9/1998 | Jones | |
| 5,826,039 A | 10/1998 | Jones | |
| 5,832,221 A | 11/1998 | Jones | |
| 5,859,898 A | 1/1999 | Checco | |
| 5,864,610 A | 1/1999 | Ronen | |
| 5,867,494 A | 2/1999 | Krishnaswamy et al. | |
| 5,867,495 A | 2/1999 | Elliott et al. | |
| 5,883,894 A | 3/1999 | Patel et al. | |
| 5,889,774 A | 3/1999 | Mirashrafi et al. | |
| 5,907,547 A | 5/1999 | Foladate et al. | |
| 5,913,176 A | 6/1999 | Barabash | |
| 5,923,659 A | 7/1999 | Curry et al. | |
| 5,930,348 A | 7/1999 | Légnier et al. | |
| 5,951,638 A | 9/1999 | Hoss et al. | |
| 5,953,504 A | 9/1999 | Sokal et al. | |
| 5,956,391 A | 9/1999 | Melen et al. | |
| 5,958,005 A | 9/1999 | Thorne et al. | |
| 5,960,416 A | 9/1999 | Block | |
| 5,999,525 A | 12/1999 | Krishnaswamy et al. | |
| 6,064,653 A | 5/2000 | Farris et al. | |
| 6,067,442 A | 5/2000 | Wiedeman et al. | |
| 6,069,890 A | 5/2000 | White et al. | |
| 6,073,160 A | 6/2000 | Grantham et al. | |
| 6,078,583 A | 6/2000 | Takahara et al. | |
| 6,081,518 A | 6/2000 | Bowman-Amuah | |
| 6,084,952 A | 7/2000 | Beerman, Jr. et al. | |
| 6,094,525 A | 7/2000 | Perlman et al. | |
| 6,094,578 A * | 7/2000 | Purcell et al. | 455/426.1 |
| 6,118,864 A | 9/2000 | Chang et al. | |
| 6,134,235 A | 10/2000 | Goldman et al. | |
| 6,137,869 A | 10/2000 | Voit et al. | |
| 6,144,667 A | 11/2000 | Doshi et al. | |
| 6,147,975 A | 11/2000 | Bowman-Amuah | |
| 6,151,390 A | 11/2000 | Volftsun et al. | |
| 6,151,629 A | 11/2000 | Trewitt | |
| 6,157,648 A | 12/2000 | Voit et al. | |
| 6,161,008 A | 12/2000 | Lee et al. | |
| 6,163,536 A | 12/2000 | Dunn et al. | |
| 6,167,042 A | 12/2000 | Garland et al. | |
| 6,178,181 B1 | 1/2001 | Gritho | |
| 6,188,760 B1 | 2/2001 | Oran et al. | |
| 6,195,697 B1 | 2/2001 | Bowman-Amuah | |
| 6,201,858 B1 | 3/2001 | Sundhar | |
| 6,202,081 B1 | 3/2001 | Naudus | |
| 6,215,858 B1 | 4/2001 | Bartholomew et al. | |
| 6,226,289 B1 | 5/2001 | Williams et al. | |
| 6,226,364 B1 | 5/2001 | O'Neil | |
| 6,233,318 B1 | 5/2001 | Picard et al. | |
| 6,240,391 B1 | 5/2001 | Ball et al. | |
| 6,240,449 B1 | 5/2001 | Cave et al. | |
| 6,253,249 B1 | 6/2001 | Belzile | |
| 6,259,914 B1 * | 7/2001 | Koster | 455/432.1 |
| 6,278,707 B1 | 8/2001 | MacMillian | |
| 6,282,270 B1 | 8/2001 | Porter | |
| 6,292,479 B1 | 9/2001 | Bartholomew et al. | |
| 6,295,291 B1 | 9/2001 | Larkins | |
| 6,301,609 B1 | 10/2001 | Aravamudan et al. | |
| 6,333,931 B1 | 12/2001 | LaPier et al. | |
| 6,335,927 B1 | 1/2002 | Elliott et al. | |
| 6,335,968 B1 | 1/2002 | Malik | |
| 6,339,594 B1 | 1/2002 | Civanlar et al. | |
| 6,366,576 B1 | 4/2002 | Haga | |
| 6,381,316 B2 | 4/2002 | Joyce et al. | |
| 6,393,269 B1 | 5/2002 | Hartmaier et al. | |
| 6,404,746 B1 | 6/2002 | Cave et al. | |
| 6,404,870 B1 | 6/2002 | Kia et al. | |
| 6,411,705 B2 | 6/2002 | Oran et al. | |
| 6,426,955 B1 | 7/2002 | Dalton et al. | |
| 6,434,143 B1 | 8/2002 | Donovan | |
| 6,453,034 B1 | 9/2002 | Donovan et al. | |
| 6,463,053 B1 | 10/2002 | Chen | |
| 6,487,283 B2 | 11/2002 | Thomas et al. | |
| 6,507,647 B1 | 1/2003 | Mandalia | |
| 6,515,997 B1 | 2/2003 | Feltner et al. | |
| 6,519,242 B1 | 2/2003 | Emery et al. | |
| 6,529,499 B1 | 3/2003 | Doshi et al. | |
| 6,567,399 B1 | 5/2003 | Schuster et al. | |
| 6,570,869 B1 * | 5/2003 | Shankar et al. | 370/352 |
| 6,584,093 B1 | 6/2003 | Salama et al. | |
| 6,584,110 B1 | 6/2003 | Mizuta et al. | |
| 6,600,735 B1 | 7/2003 | Iwama et al. | |
| 6,631,186 B1 | 10/2003 | Adams et al. | |
| 6,633,571 B1 | 10/2003 | Sakamoto | |
| 6,650,901 B1 | 11/2003 | Schuster et al. | |
| 6,658,022 B1 * | 12/2003 | West et al. | 370/467 |
| 6,674,745 B1 * | 1/2004 | Schuster et al. | 370/352 |
| 6,681,252 B1 | 1/2004 | Schuster et al. | |
| 6,687,221 B1 | 2/2004 | Kurose et al. | |
| 6,744,759 B1 | 6/2004 | Sidhu et al. | |
| 6,775,269 B1 | 8/2004 | Kaczmarczyk | |
| 6,779,032 B1 | 8/2004 | Hericourt | |
| 6,822,957 B1 | 11/2004 | Schuster | |
| 6,842,447 B1 | 1/2005 | Cannon | |
| 6,937,563 B2 | 8/2005 | Preston et al. | |
| 6,954,654 B2 | 10/2005 | Ejzak | |
| 7,005,985 B1 | 2/2006 | Steeves | |
| 2002/0167943 A1 * | 11/2002 | Hakim et al. | 370/356 |

FOREIGN PATENT DOCUMENTS

| | | |
|---|---|---|
| EP | 0794650 | 9/1997 |
| EP | 0123456 | 1/2000 |
| WO | 97/16916 | 5/1997 |
| WO | WO 97/16007 | 5/1997 |
| WO | 97/23078 | 6/1997 |
| WO | WO 97/22210 | 6/1997 |
| WO | 98/21874 | 5/1998 |
| WO | WO 97/22209 | 2/1999 |

OTHER PUBLICATIONS

Lennox et al., "Transporting User Control Information in SIP Register Payloads", Internet Engineering Task Force, Feb. 23, 1999, pp. 1-9.

H. Schulzrinne, "A Comprehensive Multimedia Control Architecture for the Internet", 1997 IEEE, pp. 65-76.

Rosenberg et al., "Internet Telephony Gateway Location", 1998 IEEE, pp. 488-496.

Wedlund et al., "Mobility Support Using SIP", 1999 Association for Computing Machinery, pp. 76-82.

Schulzrinne, et al., "Signaling for Internet Telephony", IEEE, Sep. 1998, pp. 298-307.

Handley et al., "SIP: Session Initiation Protocol", Network Working Group, Request for Comments 2543, Mar. 1999, pp. 1-104.

Camarillo et al., "The SDP Fid Attribute", Internet Engineering Task Force, Internet Draft, Apr. 2001, pp. 1-4.

Rosenberg, "SIP: Past, Present and Future", www.dynamicsoft.com, May 10, 2000.

Cable Television Laboratories, Inc., "PacketCable CMS to CMS Signaling Specification", Nov. 28, 2000.

Woods, D., "Translating Menus at the VOIP Café", www.networkcomputing.com/1026/1026wsl.html, Dec. 27, 1999, pp. 1-4.

Cisco Systems, Inc., "Architecture for Voice", Video and Integrated Data, 2000, pp. 1-23.

Marshall et al., "SIP Proxy-to-Proxy Extensions for Supporting DCS" SIP Working Group Internet Draft, Nov. 2000, pp. 1-24.

Schulzrinne, H., "The Session Initiation Protocol (SIP)", www.cs.columbia.edu/~hgs, Sep. 28, 2000.

Schulzrinne, H., Internet Telephony and Multimedia, Status and Directions, Aug. 7, 2000.

Schulzrinne et al:, "The Session Initiation Protocol: Internet-Centric Signalling", IEEE Communications Magazine, Oct. 2000, pp. 134-141.

Dalgic et al., "True Number Portability and Advanced Call Screening in a SIP-Based IP Telephony System", IEEE Communications Magazine, Jul. 1999, pp. 96-101.

Zimmerer, E., "SIP+(Inter MGC Protocol); Edition 0.0; Draft 0.1" Level 3 Communications, Dec. 1998; paragraphs 0002; 02.1; 02.4 and figure 4; <URL: www.cs.columbia.edu/sip/drafts/SIP+01.doc.

Donovan, S., "The SIP Info Method; draft-ietf-mmusic-sip-info-method-00.txt", Feb. 1999, Internet Engineering Task Force XP002209263.

Sijben, P. et al., "Toward the PSTN/Internet Inter-Networking; Media Device Control Protocol; Version 0.3; draft-sijben-megaco-mdcp-01.txt", Feb. 1999; Internet Engineering Task Force XP002209264, paragraphs 10.1 and 11.4.

Schulzrinne, P., "RTP Payload for DTMF Digits, Telephony Tones and Telephony Signals; ietf-avt-tones-01.ps" Jun. 1999, Internet Engineering Task Force XP002209265; paragraphs 0001; <URL: www.openphone.org/docs/dtmf/tones.pdf.>.

* cited by examiner

ADDRESS DEFINITION FOR IP TELEPHONY SERVICES

RELATED APPLICATION

This application is a continuation of U.S. patent application Ser. No. 09/364,005, filed Jul. 29, 1999 now U.S. Pat. No. 6,735,209, which is incorporated herein be reference.

BACKGROUND

The present invention relates generally to the field of Internet telephony, and more particularly to a method of and system for providing address definition for public switched network terminated calls that use Internet telephony services.

DESCRIPTION OF THE PRIOR ART

The existing public switched telephone network (PSTN) environment provides a rich set of telephony services. In order to work properly, the services depend on address information that is carried as part of the call setup process. This address information includes the called party number and two qualifiers to the called party number. These qualifiers are the nature of address (NOA) and the numbering plan indicator (NPI).

The called party number and the qualifiers are used in the PSTN to determine how to handle calls. The nature of address can be subscriber, national, or international. The numbering plan indicator can be public (E. 164) or private. A dialed number address with NOA and NPI values indicating the called party number is an international public number will be routed differently than the same number that has NOA and NPI values indicating that it is in a private numbering plan.

Efforts are currently underway to extend the services to devices connected to Internet protocol (IP) networks. One protocol that has been developed to handle the called related signaling in the IP based networks is the session initiation protocol (SIP). The addressing mechanism built into the SIP specification supports only global and local numbers. The SIP specification does not support the NOA and NPI qualifiers used in the PSTN. As a result, is not possible to support all of the existing PSTN services when one leg of a call must pass through an IP network or terminate to the device on an IP network.

SUMMARY

The present invention provides a method of and system for providing IP telephony services by mapping a telephony signaling protocol called party number nature of address indicator to an Internet signaling protocol nature of address indicator and mapping a telephony signaling protocol called party number numbering plan indicator to an Internet signaling protocol numbering plan indicator. The present invention is preferably implemented by extending the session initiation protocol (SIP) invite request called party URL to include a nature of address parameter and a numbering plan parameter. The system of the present invention provides a gateway that performs the mapping.

DESCRIPTION OF THE PREFERRED EMBODIMENT

Figure 1:
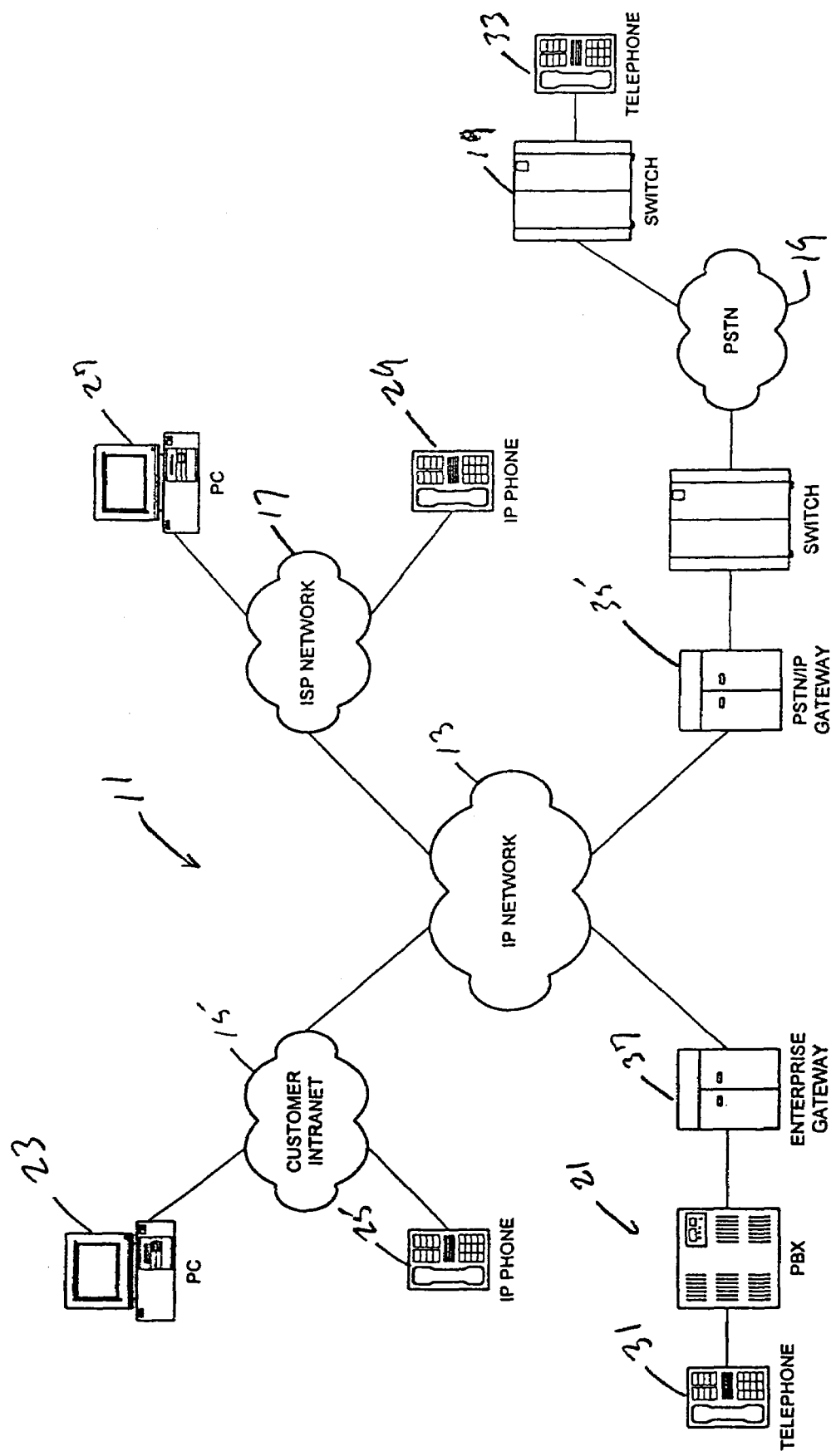
FIG. 1 is a block diagram of an Internet telephony system.

Referring now to the drawings, and first to FIG. 1, a telecommunications system is designated generally by the numeral 11. System 11 includes a plurality of networks that are interconnected through an 1P network 13, which in the preferred embodiment is the Internet.

The networks of system 11 include, in addition to IP network 13, a private intranet 15, and Internet service provider network 17, a public switched telephone network 19, and a private telephone network designated generally by the numeral 21. All of the networks in system 11 are adapted to provide IP telephony services.

In IP telephony, at least a portion of a call is transported over an IP network. Call setup and tear down are supported by an IP signaling protocol such as session initiation protocol (SIP) or H.323. The preferred embodiment of the present invention is implemented using the SIP signaling protocol. Media transport is supported by an IP protocol such as real-time transport protocol (RTP).

In the environment of private intranet 15, IP telephony enabled devices, such as IP enabled personal computers 23 and IP phones 25, are connected to private intranet 15 through local area network (LAN) connections. Personal computers 23 and IP phones 25 are SIP clients or user agents. They are provided with software that enables them to initiate and participate in IP telephony sessions. Similarly, in the environment of Internet service provider network 17, IP telephony devices, such as personal computers 27 and IP phones 29, are operably connected to Internet service provider network 17, typically through dial-up modem connections. Again, personal computers 27 and IP phones 29 are SIP clients or user agents, which allows them to initiate and participate in IP telephony sessions.

In the environments of private telephone network 21 and public switched telephone network 19, devices such as telephones 31 and 33 do not have the native capacity to participate in IP telephony sessions. Networks such as private network 21 and PSTN 19 use traditional telephony signaling protocols such as SS7, ISDN, or channel associated signaling (CAS) for call setup and tear down. Networks such as PSTN 19 and private network 21 use traditional time division multiplexed circuits for media transport. In order for users and networks such as PSTN 19 and private network 21 to participate in IP telephony sessions, a gateway to an IP network must be provided. In the case up PSTN 19, a PSTN/IP gateway 35 is provided. In the case of private network 21, an enterprise gateway 37 is provided.

Figure 2:
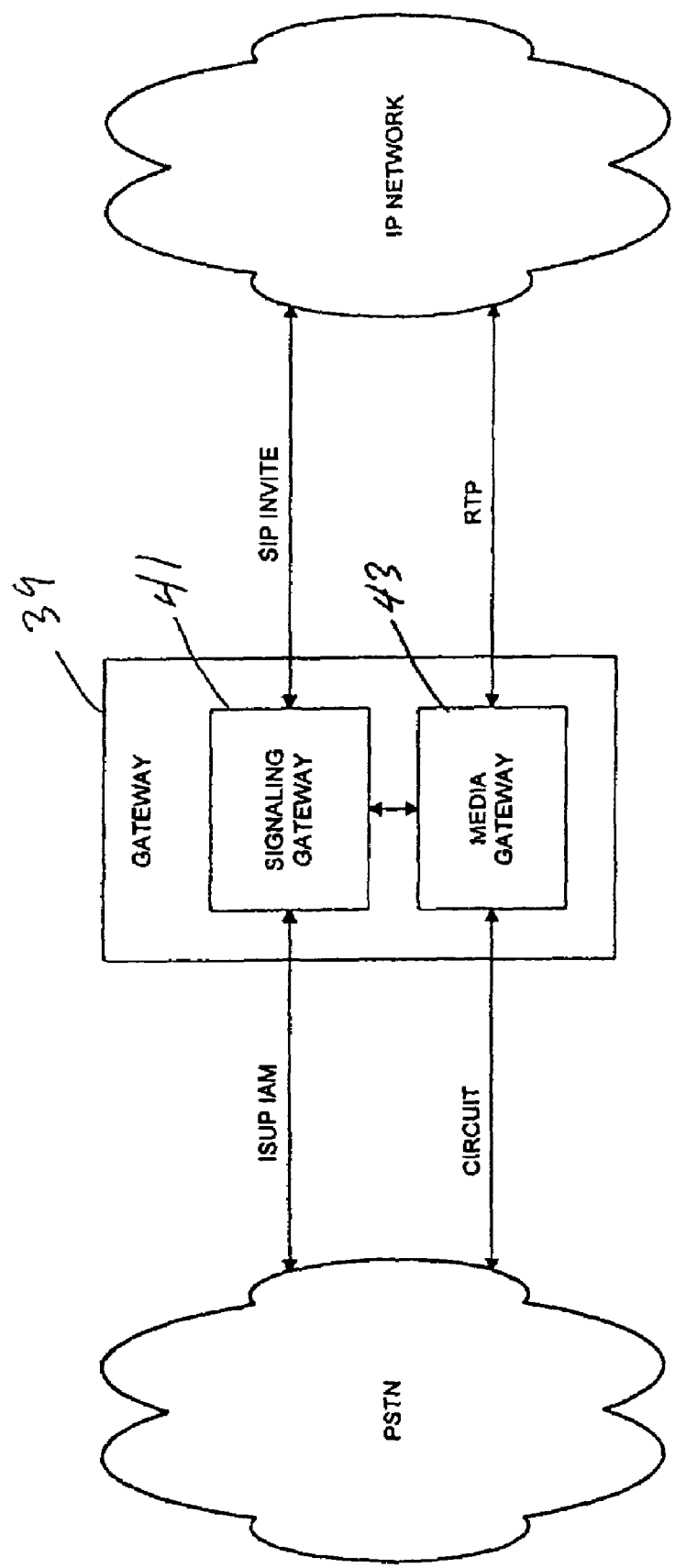
FIG. 2 is a block diagram of an Internet telephony gateway.

Referring to the FIG. 2, an IP telephony gateway is shown at 39. Gateway 39 includes a signaling gateway 41 and the media gateway 43. Generally, signaling gateway 41 provides bidirectional protocol translation between a telephony signaling protocol, such as SS7, and an IP telephony signaling protocol, such as SIP. As shown FIG. 2, signaling gateway 41 is adapted to provide bidirectional translation between, for example, ISDN user part (ISUP) initial address messages (IAM) and SIP invite requests. Media gateway 43 is adapted to provide bidirectional protocol translation between traditional time division multiplexed telephony circuits and real-time transport protocol packets.

Traditional telephony has developed a rich set of services with a rather limited addressing scheme. The traditional telephone user is able only to enter digits. Public switched telephone network switches and intelligent network elements are able to interpret the entered digits with the aid of a nature of address (NOA) indicator and a numbering plan indicator (NPI). The NOA and NPI enable the switches and intelligent network elements to correctly interpret the called party number.

As an example of public switched telephone network addressing, consider the digits 17035551234, NOA equal international, NPI equal public. This example indicates an international call to country code 1, area code 703, subscriber 555-1234. The same digits 17035551234 with NOA equal subscriber and NPI equal private indicates a special call subscriber 17035551234. A public switched telephone network switch can interpret the first example and route the call appropriately. Since the second example uses a private numbering plan, the switch must consult a database, such as a service control point (SCP) for routing instructions.

Session initiation protocol does addressing by mapping telephone numbers to URLs. SIP URLs are of the form Atelephone_number@gateway. For example, telephone number 17035551234 maps to SIP URL SIP: 17035551234@xyz.com. Currently, the SIP standard defines only two types of telephony URLs—global and local. The global URL is of the form country code plus national number. The local URL is anything that is not global. Currently, signaling gateways ignore NOAs and NPIs, and map only the dialed digits portion of an SS7 called party number to a SIP to URL. Thus, SIP can interpret the number 17035551234 only as an international call.

According to the present invention, SIP is extended to include an NOA parameter and an NPI parameter in telephony URLs. Thus gateways according to the present invention map the entire called party number, including the NOA and NPI, to a SIP URL. For example, an SS7 LAM message with a called party number 17035551234, NOA=subscriber, NPI=private maps to a SIP invite request of the form:

INVITE: 17035551234@xyz.com,NOA=subscriber, NPI=private
FROM: 7774321@abc.com
TO: 17035551234@xyz.com,NOA=subscriber,NPI=private.

The present invention thus enables the public switched telephone network to properly interpret telephone numbers that have been transported via IP telephony signaling and provide appropriate services. The present invention allows IP telephony to take advantage of the existing set of service provided by the PSTN.

What is claimed is:

1. A method for establishing a telephone call, comprising: receiving telephone number information that includes a telephone number and a nature of address indicator;
mapping the telephone number information to a session initiation protocol format to form a session initiation protocol message that includes a nature of address indicator;
establishing the telephone call based on the nature of address indicator in the formed session initiation protocol message; receiving a session initiation protocol message that includes a nature of address indicator;
mapping the received session initiation protocol message to a call establishment request of a different format, where the call establishment request includes nature of address indicator and where the different format includes one of a signaling system 7 format, an integrated services digital network format, an integrated services digital network user part format, or a channel associated signaling format; and establishing a second telephone call based on the nature of address indicator in the call establishment request.

2. The method of claim 1, where the telephone number information further includes a numbering plan indicator, and where the mapping the telephone number information to a session initiation protocol format forms the session initiation protocol message to include a numbering plan indicator.

3. The method of claim 2 where the establishing is further based on the numbering plan indicator in the session initiation protocol message.

4. A method for establishing a telephone call, comprising:
receiving telephone number information that includes a telephone number and a numbering plan indicator;
mapping the telephone number information to a session initiation protocol format to form a session initiation protocol message that includes a second numbering plan indicator; establishing the telephone call based on the numbering plan indicator in the formed session initiation protocol message;
receiving a session initiation protocol message that includes a numbering plan indicator; mapping the received session initiation protocol message to a call establishment request of a different format, where the call establishment request includes a numbering plan indicator and where the different format includes one of a signaling system 7 format, an integrated services digital network format, an integrated services digital network user part format, or a channel associated signaling format; and establishing a second telephone call based on the numbering plan indictor in the call establishment request.

5. The method of claim 4, where the telephone number information further includes a nature of address indicator, and where the mapping the telephone number information to a session initiation protocol format forms the session initiation protocol message to include a nature of address indictator.

6. The method of claim 5 where the establishing is further based on the nature of address indicator.

7. A system comprising:
means for receiving telephone number information that includes a telephone number and a nature of address indicator;
means for mapping the telephone number information to a session initiation protocol format to form a session initiation protocol message that includes a nature of address indicator;
means for establishing a telephone call based on the nature of address indicator in the formed session initiation protocol message;
means for receiving a session initiation protocol message that includes a nature of address indicator;
means for mapping the received session initiation protocol message to a call establishment request of a different format, where the call establishment request includes a nature of address indicator and where the different format includes one of a signaling system 7 format, an integrated services digital network format, an integrated services digital network user part format, or a channel associated signaling format; and
means for establishing a second telephone call based on the nature of address indicator in the call establishment request.

8. The system of claim 7 further comprising:
means for translating a numbering plan indicator included in the received session initiation protocol message to cause the call establishment request of the different format to include a numbering plan indicator.

9. A system comprising: means for receiving telephone number information that includes a telephone number and a numbering plan indicator;

means for mapping the telephone number information to a session initiation protocol format to form a session initiation protocol message that includes a numbering plan indicator;

means for establishing the telephone call based on the numbering plan indicator in the formed session initiation protocol message;

means for receiving a session initiation protocol message that includes a numbering plan indicator;

means for mapping the received session initiation protocol message to a call establishment request of a different format, where the call establishment request includes a numbering plan indicator and where the different format includes one of a signaling system 7 format, an integrated services digital network format, an integrated services digital network user part format, or a channel associated signaling format; and means for establishing a second telephone call based on the numbering plan indicator in the call establishment request.

10. The system of claim 9 further comprising:

means for translating a first nature of address indicator included in the received session initiation protocol message to cause the call establishment request of the different format to include a nature of address indicator.

* * * * *